US008665619B2

(12) United States Patent
Cui

(10) Patent No.: US 8,665,619 B2
(45) Date of Patent: Mar. 4, 2014

(54) T-TYPE THREE-LEVEL INVERTER CIRCUIT

(75) Inventor: Bin Cui, Shenzhen (CN)

(73) Assignee: Liebert Corporation, Columbus, OH (US)

( * ) Notice: Subject to any disclaimer, the term of this patent is extended or adjusted under 35 U.S.C. 154(b) by 490 days.

(21) Appl. No.: 13/104,618

(22) Filed: May 10, 2011

(65) Prior Publication Data

US 2011/0286252 A1    Nov. 24, 2011

(30) Foreign Application Priority Data

May 19, 2010 (CN) .......................... 2010 1 0176711

(51) Int. Cl.
*H02H 7/122* (2006.01)
(52) U.S. Cl.
USPC ............................ 363/56.05; 363/40; 363/132
(58) Field of Classification Search
USPC ............... 363/40, 43, 56.05, 56.12, 131, 132
See application file for complete search history.

(56) References Cited

U.S. PATENT DOCUMENTS

| | | | |
|---|---|---|---|
| 4,670,828 A * | 6/1987 | Shekhawat et al. ......... | 363/56.04 |
| 6,930,899 B2 * | 8/2005 | Bakran et al. .................. | 363/132 |
| 7,639,515 B2 * | 12/2009 | Ponnaluri et al. ............... | 363/17 |
| 8,116,103 B2 | 2/2012 | Zacharias et al. | |
| 2003/0026118 A1 * | 2/2003 | Ikimi et al. ..................... | 363/132 |
| 2004/0246756 A1 * | 12/2004 | Bijlenga et al. ............... | 363/132 |
| 2009/0244936 A1 | 10/2009 | Falk et al. | |
| 2010/0084922 A1 | 4/2010 | Gollentz et al. | |
| 2011/0116293 A1 * | 5/2011 | Tabata et al. ................... | 363/132 |
| 2011/0286252 A1 * | 11/2011 | Cui ................................ | 363/131 |
| 2012/0307533 A1 * | 12/2012 | Gekeler .......................... | 363/41 |
| 2013/0044526 A1 * | 2/2013 | Soua .............................. | 363/131 |
| 2013/0107599 A1 * | 5/2013 | Shekhawat et al. ............ | 363/131 |

FOREIGN PATENT DOCUMENTS

| | | |
|---|---|---|
| CN | 101674028 A | 3/2010 |
| CN | 101682260 A | 3/2010 |
| JP | H04334977 A | 11/1992 |
| WO | WO-2007048420 A1 | 5/2007 |

OTHER PUBLICATIONS

First Chinese Office Action regarding Application No. 201010176711.6, dated May 24, 2013. Translation provided by Unitalen Attorneys at Law.

* cited by examiner

*Primary Examiner* — Jeffrey Sterrett
(74) *Attorney, Agent, or Firm* — Harness, Dickey & Pierce, P.L.C.

(57) ABSTRACT

This invention relates to a T-type three-level inverter circuit. The circuit includes an absorption unit. In the absorption unit, a first terminal of the first resistor is connected to a positive bus terminal, and a second terminal of the first resistor is connected to a first terminal of the first capacitor and a negative electrode of the first diode; a second terminal of the first capacitor and an positive electrode of the first diode are respectively connected to an emitter and a collector of the first controllable switch tube; a first terminal of the second resistor is connected to a negative bus terminal, and a second terminal of the second resistor is connected to a positive electrode of a third diode; a negative electrode of the third diode is connected to both a first terminal of the second capacitor and a positive electrode of a second diode; and a second terminal of the second capacitor and a negative electrode of the second diode are respectively connected to a collector and a emitter of the second controllable switch tube. As the T-type three-level inverter circuit according to the invention is implemented, a voltage stress on the bidirectional switch tube is effectively reduced due to strong absorption capacity of the absorption unit, and thus the bidirectional switch tube can adopt a tube having a relatively low breakdown voltage value. Moreover, the absorption unit has a low cost and a small loss.

11 Claims, 1 Drawing Sheet

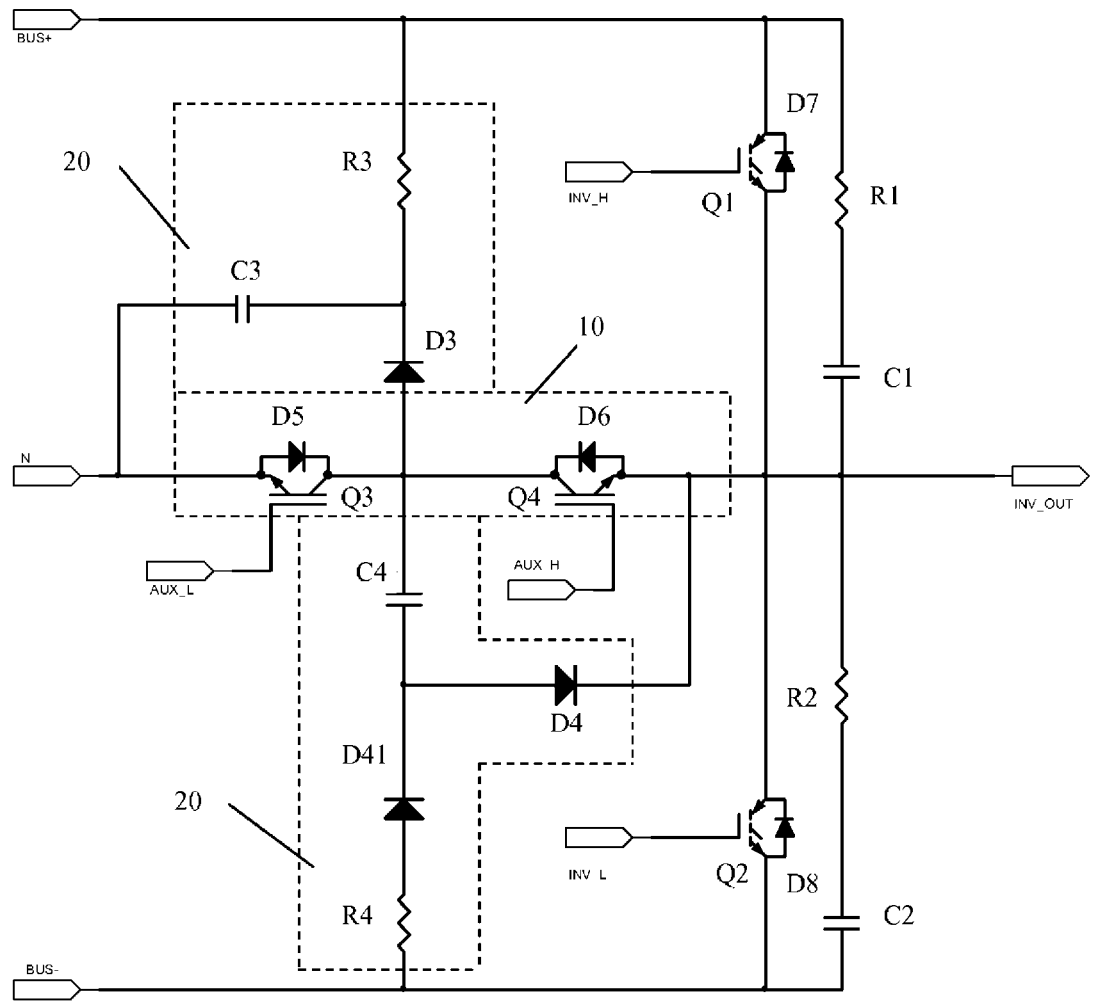

T-TYPE THREE-LEVEL INVERTER CIRCUIT

FIELD OF THE INVENTION

The present invention relates to electric and electronic techniques, and more particularly to a T-type three-level inverter circuit.

BACKGROUND OF THE INVENTION

A bidirectional switch of an existing T-type three-level inverter circuit primarily employs an RC (Resistor/Capacitor) absorption scheme. The RC absorption scheme has a defect in that absorption capacity is not strong enough, a voltage stress for the bidirectional switch is relatively large, and a high-voltage withstanding tube has to be adopted. It is difficult for the high-voltage withstanding tube to adapt to a high-frequency application, and a loss may be relatively increased.

SUMMARY OF THE INVENTION

With respect to the above-described defect in the prior art that the RC absorption capacity is not strong, a technical problem to be solved by the present invention is to provide an inverter circuit having strong absorption capacity.

A technical solution employed by the present invention to solve the technical problem thereof is as follows. An inverter circuit including a bidirectional, controllable switch is constructed, the bidirectional, controllable switch including a first controllable switch and a second controllable switch in inverse series connection, wherein the inverter circuit also includes an absorption unit, the absorption unit including a first resistor, a first capacitor, a first diode, a second resistor, a second capacitor, and a second diode, in which a first terminal of the first resistor is connected to a positive bus terminal, and a second terminal of the first resistor is connected to a first terminal of the first capacitor and a negative electrode of the first diode; a second terminal of the first capacitor and a positive electrode of the first diode are respectively connected to a first electrode and a second electrode of the first controllable switch; a first terminal of the second resistor is connected to a negative bus terminal, and a second terminal of the second resistor is connected to both a first terminal of the second capacitor and a positive electrode of the second diode; and a second terminal of the second capacitor and a negative electrode of the second diode are respectively connected to a second electrode and a first electrode of the second controllable switch.

In an inverter circuit according to the present invention, values of reverse breakdown voltage of the second diode and the first diode are higher than a bus voltage.

In an inverter circuit according to the present invention, the bidirectional switch also includes a fourth diode in inverse parallel connection with the first controllable switch and a fifth diode in inverse parallel connection with the second controllable switch.

In an inverter circuit according to the present invention, the inverter circuit also includes a third resistor, a third capacitor, a fourth resistor and a fourth capacitor sequentially connected in series between the positive bus terminal and the negative bus terminal.

In an inverter circuit according to the present invention, the inverter circuit also includes a third controllable switch, a fourth controllable switch, a sixth diode and a seventh diode, in which both an emitter of the third controllable switch and a collector of the fourth controllable switch are connected to a connection point of the third capacitor and the fourth resistor; a collector of the third controllable switch is connected to the positive bus terminal; an emitter of the fourth controllable switch is connected to the negative bus terminal; a negative electrode and a positive electrode of the sixth diode are respectively connected to the collector and the emitter of the third controllable switch; and a negative electrode and a positive electrode of the seventh diode are respectively connected to the collector and the emitter of the fourth controllable switch.

In an inverter circuit according to the present invention, the absorption unit further includes a third diode, a positive electrode of the third diode is connected to the second terminal of the second resistor and a negative electrode of the third diode is connected to both the first terminal of the second capacitor and the positive electrode of the second diode.

In an inverter circuit according to the present invention, the first electrode and the second electrode for each of the first controllable switch and the second controllable switch are an emitter and a collector of a bipolar transistor, respectively.

In an inverter circuit according to the present invention, the inverter circuit is a T-type three-level inverter circuit.

As the T-type three-level inverter circuit according to the invention is implemented, advantageous effects as follows are achieved. When the first controllable switch in the bidirectional switch is on, the first capacitor is clamped to the positive bus through the first resistor. When the first controllable switch in the bidirectional switch is off, the first capacitor clamps the first controllable switch through the first diode, and a clamping voltage is the positive bus voltage. Therefore, the first capacitor, the first resistor and the first diode in the absorption unit can effectively reduce a voltage stress for the first controllable switch, and thus a transistor having a relatively low breakdown voltage value can be adopted for the first controllable switch. Likewise, when the second switch in the bidirectional switch is on, the second capacitor is clamped to the negative bus through the second resistor and the third diode. When the second controllable switch in the bidirectional switch is off, the second capacitor clamps the second controllable switch through the second diode, and the clamping voltage is the negative bus voltage. Therefore, the second capacitor, the second diode, the second resistor and the third diode in the absorption unit can effectively reduce the voltage stress for the second controllable switch, and thus a transistor having a relatively low breakdown voltage value can be adopted for the second controllable switch. Moreover, the absorption unit has a low cost and a small loss.

BRIEF DESCRIPTION OF THE DRAWINGS

Hereinbelow, the present invention will be further described in combination with the accompanying drawings and embodiments. In the accompanying drawings:

FIG. 1 is a circuit diagram illustrating a T-type three-level inverter circuit according to a first embodiment of the present invention.

DETAILED DESCRIPTION OF THE EMBODIMENTS

In order to make objects, technical solutions and advantages of the present invention more apparent, the present invention is described in further detail hereinafter in combination with the accompanying drawings.

As shown in FIG. 1, in a circuit diagram illustrating a T-type three-level inverter circuit according to a first embodiment of the present invention, the T-type three-level inverter circuit includes a bidirectional switch 10. The bidirectional switch 10 includes a first controllable switch Q3 and a second controllable switch Q4 in inverse series connection, and a fourth diode D5 in inverse parallel connection with the first controllable switch Q3 and a fifth diode D6 in inverse parallel connection with the second controllable switch Q4. The fourth diode D5 and the fifth diode D6 provide a freewheeling function. The T-type three-level inverter circuit also includes a third controllable switch Q1, a fourth controllable switch Q2, a sixth diode D7, a seventh diode D8, a third resistor R1, a fourth resistor R2, a third capacitor C1 and a fourth capacitor C2. Specifically, the third resistor R1, the third capacitor C1, the fourth resistor R2 and the fourth capacitor C2 are sequentially connected in series between a positive bus terminal BUS+ and a negative bus terminal BUS−. Both an emitter of the third controllable switch Q1 and a collector of the fourth controllable switch Q2 are connected to a connection point of the third capacitor C1 and the fourth resistor R2. A collector of the third controllable switch Q1 is connected to the positive bus terminal BUS+. An emitter of the fourth controllable switch Q2 is connected to the negative bus terminal BUS−. A negative electrode and a positive electrode of the sixth diode D7 are respectively connected to the collector and the emitter of the third controllable switch Q1. The negative electrode and the positive electrode of the seventh diode D8 are respectively connected to the collector and the emitter of the fourth controllable switch Q2. The T-type three-level inverter circuit also includes an absorption unit 20. The absorption unit 20 includes a first resistor R3, a first capacitor C3, a first diode D3, a second resistor R4, a second capacitor C4, a second diode D4 and a third diode D41. Specifically, a first terminal of the first resistor R3 is connected to the positive bus terminal, and a second terminal of the first resistor R3 is connected to a first terminal of the first capacitor C3 and a negative electrode of the first diode D3. A second terminal of the first capacitor C3 and a positive electrode of the first diode D3 are respectively connected to an emitter and a collector of the first controllable switch Q3. A first terminal of the second resistor R4 is connected to the negative bus terminal, and a second terminal of the second resistor R4 is connected to a positive electrode of the third diode D41. A negative electrode of the third diode D41 is connected to both a first terminal of the second capacitor C4 and a positive electrode of the second diode D4. A second terminal of the second capacitor C4 and a negative electrode of the second diode D4 are respectively connected to a collector and an emitter of the second controllable switch Q4.

Preferably, values of reverse breakdown voltage of the second diode D4 and the first diode D3 are higher than a bus voltage. For example, positive and negative bus voltages are 400V, and a switch tube having a reverse breakdown voltage value of 600V can be adopted for the first diode D3 and the second diode D4. In this way, when the first capacitor C3 clamps the first controllable switch Q3 through the first diode D3, the positive bus voltage cannot reversely breakdown the first diode D3; and when the second capacitor C4 clamps the second controllable switch Q4 through the second diode D4, the negative bus voltage cannot reversely breakdown the second diode D4.

Hereinbelow, the principle of the T-type three-level inverter circuit is described. The terminal BUS+ and the terminal BUS− are respectively a positive bus input terminal and a negative bus input terminal. A terminal N and a terminal INV_OUT are two output terminals for an inverted voltage. When a normal Sinusoidal Pulse Width Modulation (SPWM) signal is applied to a control terminal of the third controllable switch Q1, and the fourth controllable switch Q2 is controlled to be cut off and the second controllable switch Q4 is always on, and meanwhile the first controllable switch Q3 and the third controllable switch Q1 are controlled to be on or off complementarily, the inverter circuit outputs a positive half cycle of the inverted voltage. When a normal SPWM signal is applied to a control terminal of the fourth controllable switch Q2, and the third controllable switch Q1 is controlled to be off and the first controllable switch Q3 is always on, and meanwhile the second controllable switch Q4 and the fourth switch Q2 are controlled to be on or off complementarily, the inverter circuit outputs a negative half cycle of the inverted voltage. When the first controllable switch Q3 is on, the first capacitor C3 is clamped to the positive bus through the first resistor R3. When the first controllable switch Q3 is off, the first capacitor C3 clamps the first controllable switch Q3 through the first diode D3, and a clamping voltage is the positive bus voltage. Therefore, the first capacitor C3, the first resistor R3 and the first diode D3 in the absorption unit effectively reduce a voltage stress on the first controllable switch Q3 due to strong absorption capacity, and thus a transistor having a relatively low breakdown voltage value can be adopted for the first controllable switch Q3. When the second switch Q4 is on, the second capacitor C4 is clamped to the negative bus through the second resistor R4 and the third diode D41. When the second controllable switch Q4 is off, the second capacitor C4 clamps the second diode Q4 through the second diode D4, and the clamping voltage is the negative bus voltage. Therefore, the second capacitor C4, the second diode D4, the second resistor R4 and the third diode D41 in the absorption unit effectively reduce the voltage stress on the second controllable switch Q4 due to strong absorption capacity, and thus a transistor having a relatively low breakdown voltage value can be adopted for the second controllable switch Q4. Moreover, the absorption unit 20 has a low cost and a small loss.

The foregoing is merely preferred embodiments of the present invention, and is not intended to limit the present invention. For those skilled in the art, there can be various changes and variations for the present invention. Any modifications, equivalents, improvements and the like made within the spirit and principle of the present invention should be encompassed in the scope defined by the appended claims of the present invention.

What is claimed is:

1. An inverter circuit, comprising a bidirectional, controllable switch (10), the bidirectional, controllable switch (10) including a first controllable switch (Q3) and a second controllable switch (Q4) in inverse series connection, wherein the inverter circuit also comprises an absorption unit (20), the absorption unit (20) including a first resistor (R3), a first capacitor (C3), a first diode (D3), a second resistor (R4), a second capacitor (C4), and a second diode (D4), in which a first terminal of the first resistor (R3) is connected to a positive bus terminal, and a second terminal of the first resistor (R3) is connected to a first terminal of the first capacitor (C3) and a negative electrode of the first diode (D3); a second terminal of the first capacitor (C3) and a positive electrode of the first diode (D3) are respectively connected to a first electrode and a second electrode of the first controllable switch (Q3); a first terminal of the second resistor (R4) is connected to a negative bus terminal, and a second terminal of the second resistor (R4) is connected to a first terminal of the second capacitor (C4) and a positive electrode of the second diode (D4); and a second terminal of the second capacitor (C4) and a negative electrode of the second diode (D4) are respectively connected to a second electrode and a first electrode of the second controllable switch Q4.

2. The inverter circuit according to claim 1, wherein the bidirectional switch (10) also comprises a fourth diode (D5)

in inverse parallel connection with the first controllable switch (Q3) and a fifth diode (D6) in inverse parallel connection with the second controllable switch (Q4).

3. The inverter circuit according to claim 1, wherein the inverter circuit also comprises a third resistor (R1), a third capacitor (C1), a fourth resistor (R2) and a fourth capacitor (C2) sequentially connected in series between the positive bus terminal and the negative bus terminal.

4. The inverter circuit according to claim 3, wherein the inverter circuit also comprises a third controllable switch (Q1), a fourth controllable switch (Q2), a sixth diode (D7) and a seventh diode (D8), in which both an emitter of the third controllable switch (Q1) and a collector of the fourth controllable switch (Q2) are connected to a connection point of the third capacitor (C1) and the fourth resistor (R2); a collector of the third controllable switch (Q1) is connected to the positive bus terminal; an emitter of the fourth controllable switch (Q2) is connected to the negative bus terminal; a negative electrode and a positive electrode of the sixth diode (D7) are respectively connected to the collector and the emitter of the third controllable switch (Q1); and a negative electrode and a positive electrode of the seventh diode (D8) are respectively connected to the collector and the emitter of the fourth controllable switch (Q2).

5. The inverter circuit according to claim 1, wherein values of reverse breakdown voltage of the second diode (D4) and the first diode (D3) are higher than a bus voltage.

6. The inverter circuit according to claim 5, wherein the bidirectional switch (10) also comprises a fourth diode (D5) in inverse parallel connection with the first controllable switch (Q3) and a fifth diode (D6) in inverse parallel connection with the second controllable switch (Q4).

7. The inverter circuit according to claim 5, wherein the inverter circuit also comprises a third resistor (R1), a third capacitor (C1), a fourth resistor (R2) and a fourth capacitor (C2) sequentially connected in series between the positive bus terminal and the negative bus terminal.

8. The inverter circuit according to claim 7, wherein the inverter circuit also comprises a third controllable switch (Q1), a fourth controllable switch (Q2), a sixth diode (D7) and a seventh diode (D8), in which both an emitter of the third controllable switch (Q1) and a collector of the fourth controllable switch (Q2) are connected to a connection point of the third capacitor (C1) and the fourth resistor (R2); a collector of the third controllable switch (Q1) is connected to the positive bus terminal; an emitter of the fourth controllable switch (Q2) is connected to the negative bus terminal; a negative electrode and a positive electrode of the sixth diode (D7) are respectively connected to the collector and the emitter of the third controllable switch (Q1); and a negative electrode and a positive electrode of the seventh diode (D8) are respectively connected to the collector and the emitter of the fourth controllable switch (Q2).

9. The inverter circuit according to claim 1, wherein the absorption unit (20) further includes a third diode (D41), a positive electrode of the third diode (D41) is connected to the second terminal of the second resistor (R4) and a negative electrode of the third diode (D41) is connected to both the first terminal of the second capacitor (C4) and the positive electrode of the second diode (D4).

10. The inverter circuit according to claim 1, wherein the first electrode and the second electrode for each of the first controllable switch (Q3) and the second controllable switch (Q4) are an emitter and a collector of a bipolar transistor, respectively.

11. The inverter circuit according to claim 1, wherein the inverter circuit is a T-type three-level inverter circuit.

* * * * *

UNITED STATES PATENT AND TRADEMARK OFFICE
CERTIFICATE OF CORRECTION

| | | |
|---|---|---|
| PATENT NO. | : 8,665,619 B2 | Page 1 of 1 |
| APPLICATION NO. | : 13/104618 | |
| DATED | : March 4, 2014 | |
| INVENTOR(S) | : Cui | |

It is certified that error appears in the above-identified patent and that said Letters Patent is hereby corrected as shown below:

In the Specification:

Column 4, Line 21, after "second", insert --controllable--

Column 4, Line 25, delete "diode" and insert --controllable switch--

Signed and Sealed this
Sixteenth Day of September, 2014

Michelle K. Lee
*Deputy Director of the United States Patent and Trademark Office*